Figure 1:
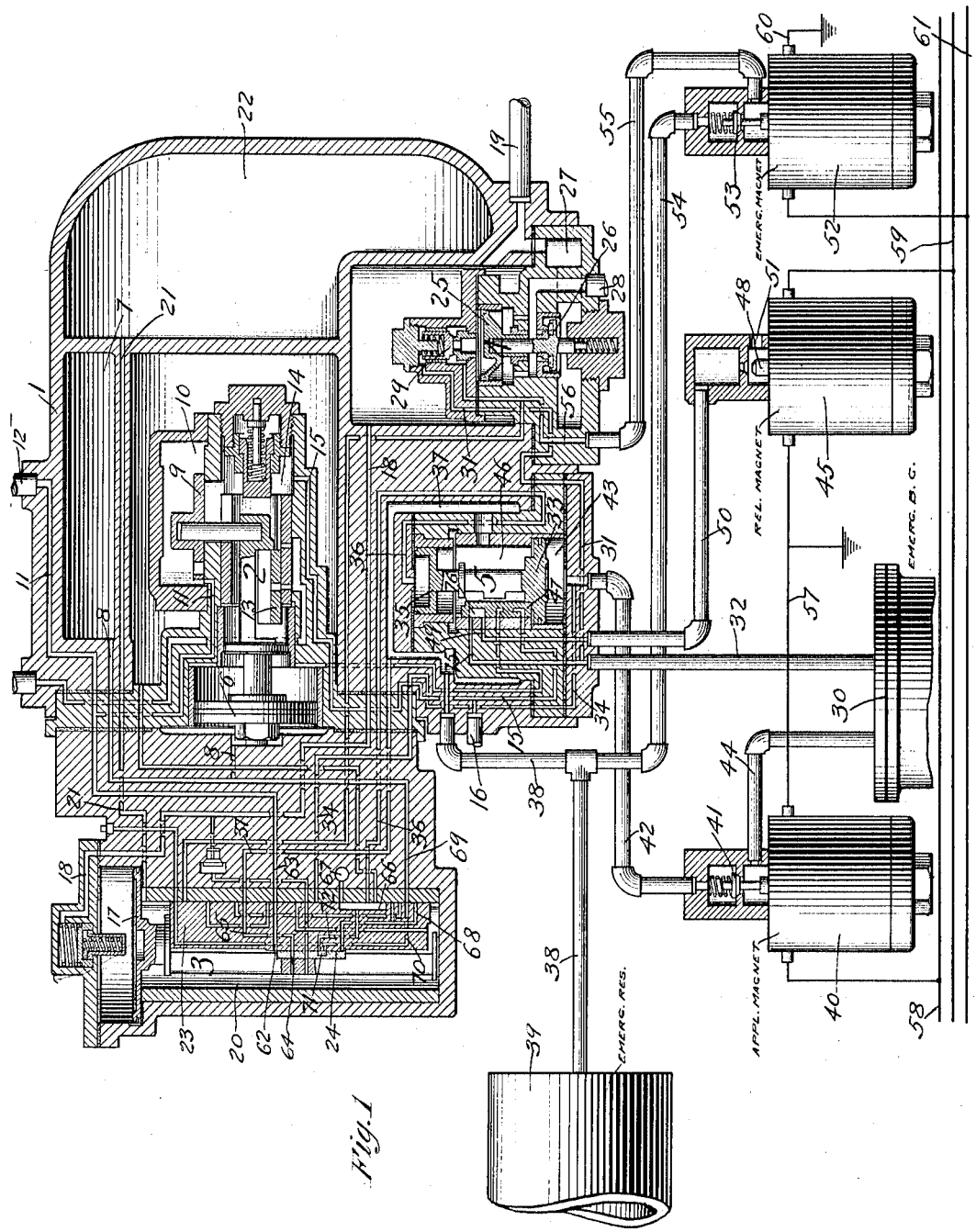

W. V. TURNER.
ELECTROPNEUMATIC CONTROL VALVE.
APPLICATION FILED MAY 3, 1911.

1,114,823.

Patented Oct. 27, 1914.
3 SHEETS—SHEET 1.

WITNESSES

INVENTOR
Walter V. Turner
by Wm. H. Cady
Att'y.

W. V. TURNER.
ELECTROPNEUMATIC CONTROL VALVE.
APPLICATION FILED MAY 3, 1911.

1,114,823.

Patented Oct. 27, 1914.
3 SHEETS—SHEET 2.

WITNESSES

INVENTOR
Walter V. Turner
by Wm. M. Cady
Att'y.

W. V. TURNER.
ELECTROPNEUMATIC CONTROL VALVE.
APPLICATION FILED MAY 3, 1911.

1,114,823.

Patented Oct. 27, 1914.
3 SHEETS—SHEET 3.

WITNESSES

INVENTOR
Walter V. Turner
by Wm. M. Cady
Atty.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

ELECTROPNEUMATIC CONTROL-VALVE.

1,114,823.      Specification of Letters Patent.      Patented Oct. 27, 1914.

Application filed May 3, 1911. Serial No. 624,869.

*To all whom it may concern:*

Be it known that I, WALTER V. TURNER, a citizen of the United States, residing at Edgewood, in the county of Allegheny and State of Pennsylvania, have invented new and useful Improvements in Electropneumatic Control-Valves, of which the following is a specification.

This invention relates to fluid pressure brakes, and more particularly to that type which is adapted to be operated electrically by manipulation of a switch, pneumatically by manipulation of a brake valve, or automatically by venting the train pipe due to a break-in-two of the train or similar accident.

In prior equipments of the above character, the electric controlling apparatus has been applied in connection with the usual well known triple valve device and in operating the brakes electrically with this type of apparatus, it is necessary to provide means for controlling the pneumatic exhaust of the triple valve device so as to hold the air in the brake cylinder in making electric applications of the brakes. With the pneumatic exhaust controlled electrically, it sometimes happens that the electric apparatus becomes disabled, so that pneumatic exhaust is held closed, and consequently, when pneumatic control of the brakes is attempted, the brakes cannot be released, owing to the closed exhaust port. In addition to the above, there are various other reasons of a similar nature why it is highly desirable in an electro-pneumatic brake, to so separate the electric from the pneumatic brake that the pneumatic brake can be operated regardless of the condition of the electric brake control mechanism.

The principal object of my present invention is to obviate the above difficulty and provide an electro-pneumatic brake equipment in which the electric control will not interfere in any way with the pneumatic control.

To attain the main features of my invention I employ a fluid pressure brake apparatus having two brake cylinders, one for pneumatic service and the other an emergency brake cylinder adapted to be employed in an emergency application of the brakes.

An apparatus of the above character which is especially adapted for my invention is of the character covered in my prior applications, Serial No. 549,229, filed March 14, 1910; Serial No. 605,387, filed January 30, 1911; and Serial No. 618,218, filed March 31, 1911.

The above applications cover what is known commercially as the P. C. control valve, and while my invention may be applied to other forms of apparatus, I have preferred to show the same as applied to an apparatus similar to that shown in said applications.

Figure 2:
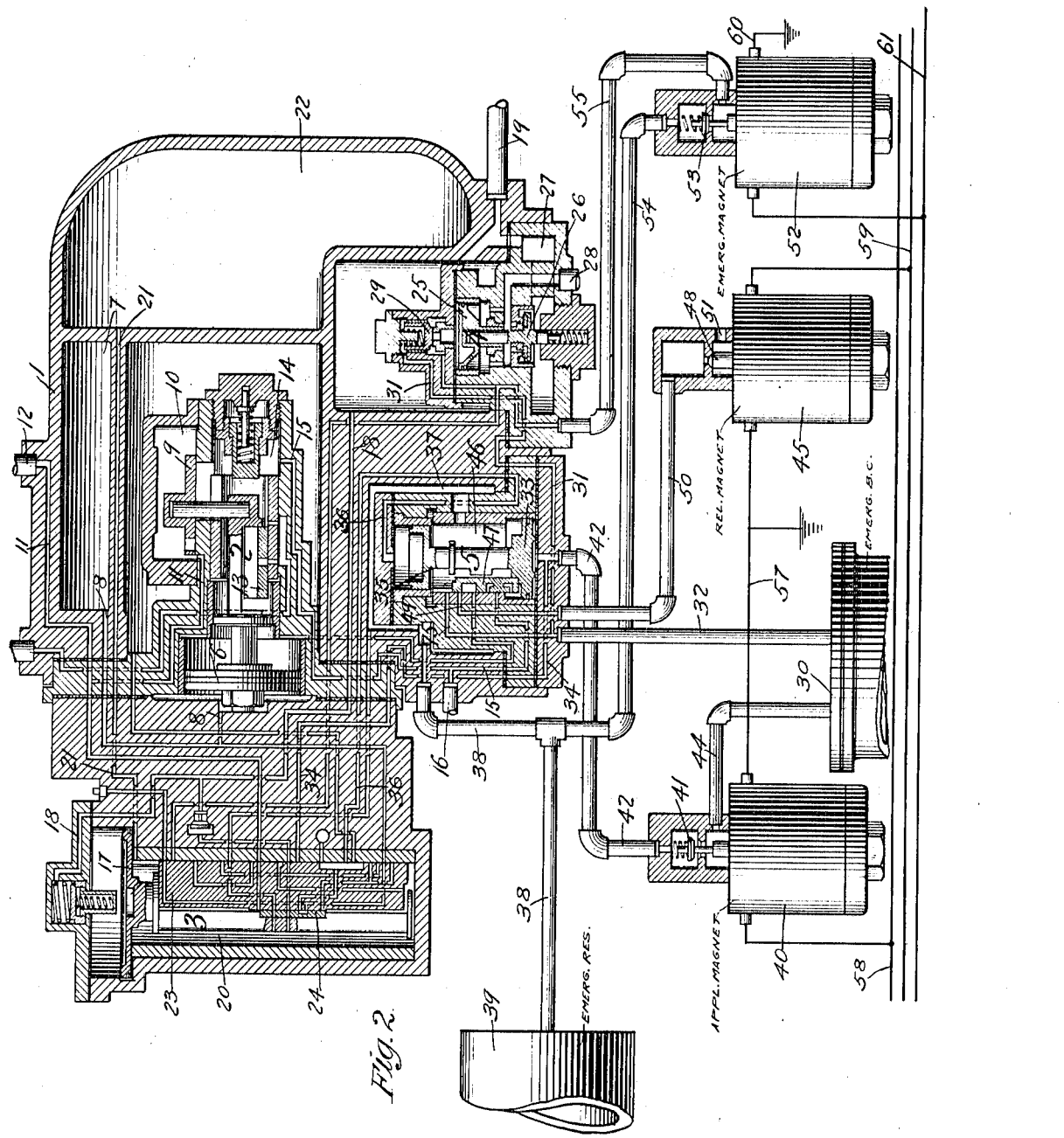

In the accompanying drawings, Figure 1 is a diagrammatic sectional view of a control valve device with my improvement applied thereto, showing the parts in release position; Fig. 2 a similar view, showing the parts in electric service application position; and Fig. 3 a similar view, showing the parts in electric emergency application position.

As shown in the drawings, the control valve device may comprise a casing 1 containing an application valve device 2, an equalizing valve device 3, a quick action valve mechanism 4, and an emergency valve mechanism 5.

The application valve device 2 comprises a piston 6 subject on one side to the pressure of an application chamber 7 to which it is connected by a passage 8 and on the opposite side to the pressure of a service brake cylinder. The piston 6 operates an application valve 9 located in the valve chamber 10 connected by a passage 11 to pipe 12 leading to a service reservoir, and a release valve 13 adapted to release fluid from a valve chamber 14 having a passage 15 connected to pipe 16 leading to the service brake cylinder.

The equalizing valve device 3 comprises a piston 17 subject on its outer face to train pipe pressure which is supplied thereto through a passage 18 leading to the train pipe 19 and subject on its inner face to pressure of the valve chamber 20 which is connected by a pressure 21 with a pressure chamber 22. Contained in valve chamber 20 and adapted to be operated by the piston 17 are the main slide valve 23 and the auxiliary slide valve 24 mounted on said main valve and having a movement relative thereto.

The quick action valve mechanism 4 comprises a piston 25 and a valve 26 operated by said piston for venting fluid from the train pipe 19 through passage 27 to an exhaust pipe 28. A valve piston 29 having the chamber at one side connected to the emergency brake cylinder 30 through passage 31 and pipe 32 controls the admission of fluid to the emergency piston 25 for operating the same.

The emergency valve mechanism 5 comprises a differential piston device provided with a large piston head 33 having a passage 34 leading from its outer face to the seat of the main slide valve 23 and a small piston head 35 having a passage 36 leading from its outer face to the seat of the main slide valve. The valve chamber 46 intermediate the piston heads 33 and 35 is connected by a passage 37 to pipe 38 leading to the emergency reservoir 39 and contains a slide valve 47.

According to my invention, an electric service brake magnet 40 is provided for operating a valve 41 adapted to control communication from a pipe 42 communicating with chamber 43 at the outer face of piston head 33, to pipe 44 which opens into the emergency brake cylinder 30. An electric release magnet 45 is also provided for operating a valve 48 adapted to control communication from a passage 49 leading to the seat of valve 47 and opening into pipe 50, to an exhaust port 51.

For electrically effecting an emergency application of the brakes an electric emergency magnet 52 is provided for operating a valve 53, the latter being adapted to control communication from a pipe 54 leading to the emergency reservoir 39, to a pipe 55 which communicates with a passage 56 opening into the passage 74 leading to the under side of the valve piston 29.

The electric controlling magnets may be connected to the usual electric train wires leading to a suitable switch on one of the vehicles, the manipulation of which is adapted to energize or deënergize the magnets as desired.

As shown, one terminal of the electric service application magnet 40 is connected to a ground wire 57, and the other terminal to a train wire 58, one terminal of the release magnet 45 is connected to ground wire 57 and the other to a train wire 59, and one terminal of the emergency magnet 52 is connected to ground wire 60 and the other terminal to train wire 61.

Upon charging the train pipe with fluid under pressure, air flows through the passage 18 and the usual feed groove around the equalizing piston 17 charging the valve chamber 20 and the pressure chamber 22 by way of passage 21 with fluid under pressure. The service reservoir is charged from valve chamber 20 through port 62, passage 63, passage 11, and pipe 12, and the emergency reservoir 39 is charged with fluid under pressure from said valve chamber through ports 64 and 65, passage 37, and pipe 38.

In the normal release position of the parts, passage 34 leading to piston head 33 of the emergency valve mechanism 5 is closed at the slide valve 23 while passage 36 leading to the piston head 35 is connected by cavity 66 in slide valve 23 with an exhaust port 67. As the piston head 33 is adapted to permit equalization of fluid pressure from the valve chamber 46 to the chamber 43, the pressure in the latter chamber operates, with piston head 35 open to the atmosphere, to shift the emergency valve mechanism 5 to the position shown in Fig. 1.

A pneumatic service application of the brakes may be made by reducing the train pipe pressure in the usual manner and piston 17 is thereby shifted to service application position, in which fluid is supplied from valve chamber 20 and pressure chamber 22 to the application chamber 7 through port 68 and passage 69. Fluid under pressure thus admitted to the application piston 6 operates the same and the valve 9 is thereby shifted to open communication for supplying fluid from the service reservoir to the passage 15 and the service brake cylinder. When the pressure in the pressure chamber has reduced by flow to the application chamber to substantially equal the reduced train pipe pressure, the piston 17 is operated to lap the application supply port 68. Fluid continues to flow from the service reservoir to the service brake cylinder until the brake cylinder pressure has increased to substantially equal that in the application chamber and then the application piston 6 moves the valve 9 to cut off the further supply of fluid to the brake cylinder. The brake cylinder pressure may be further increased by making further reductions in train pipe pressure as desired, the parts operating in the same manner as above described. To release the brakes, the train pipe pressure is increased and the piston 17 is thereby shifted to release position, in which the passage 69 is connected to the exhaust through port 70, cavity 71 in the auxiliary valve 24, port 72, cavity 66, and exhaust port 67.

Figure 3:
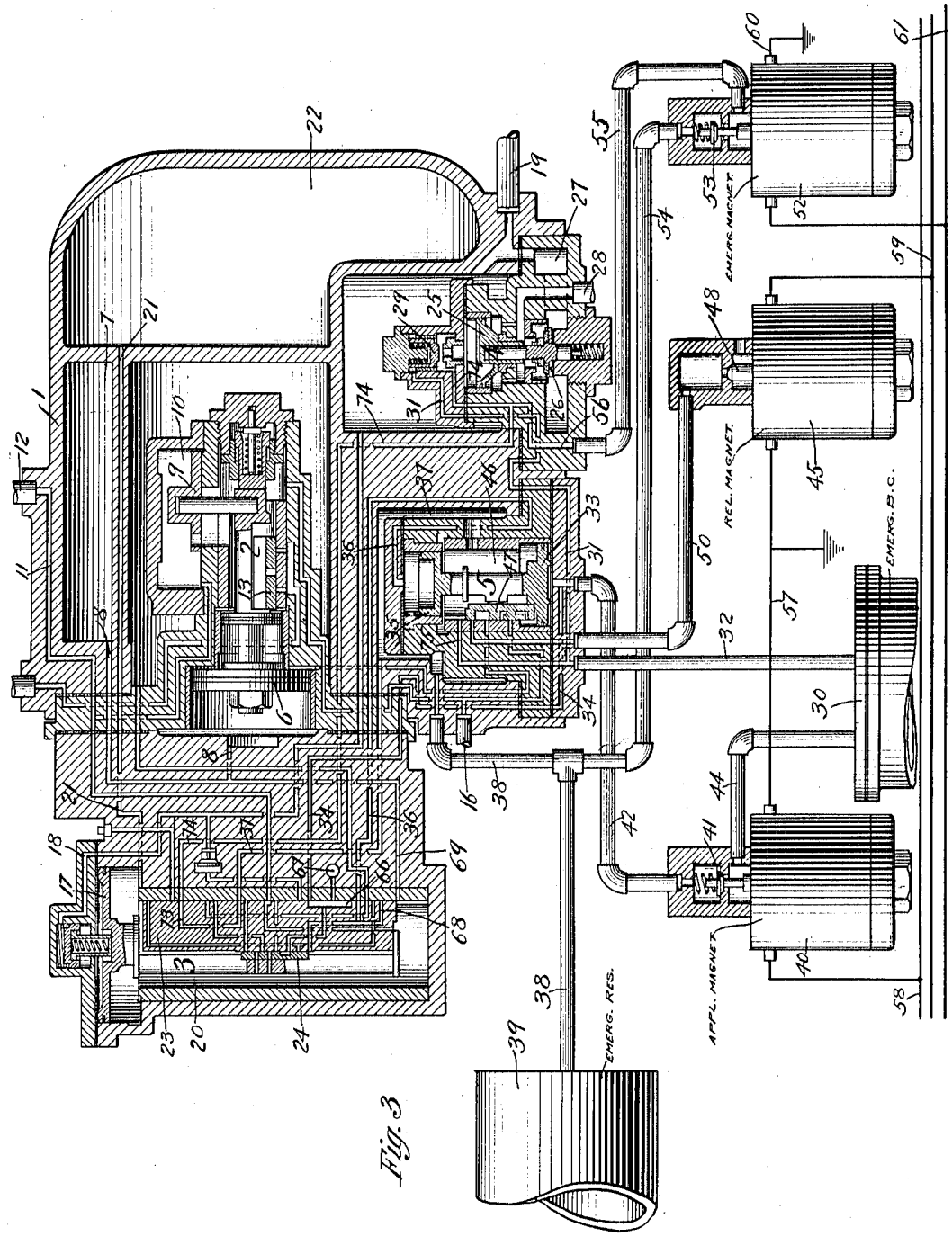

An emergency application of the brakes may be effected by making a sudden reduction in train pipe pressure which operates to shift the piston 17 to emergency position, as shown in Fig. 3, in which fluid from the emergency reservoir is supplied to the under side of the valve piston 29 through passage 37, port 73, and passage 74. The valve piston 29 is thereupon lifted from its seat and fluid under pressure is admitted to the quick action piston 25, operating the same to open the valve 26 and thereby vent fluid from the train pipe through passage 27 to exhaust port 28. A local reduction in train pipe pressure is thus made which produces quick serial action throughout the train in the usual well known manner. The passage 69 is uncovered by the movement of slide valve 23, so that fluid is supplied to the application chamber 7 to effect the movement of the application valve device 2 to application position.

In the emergency position, passage 34 is connected to the exhaust port 67 through cavity 66 and passage 36 leading to the piston head 35 is connected to a port opening of port 68 in slide valve 23, so that fluid is supplied to the piston head 35 and the emergency valve mechanism 5 is thereby shifted to the position shown in Fig. 3. In this position, the valve 47 uncovers passage 75, so that fluid from the emergency reservoir 39 is supplied to the emergency brake cylinder 30 through pipe 32.

Having now briefly described the operation of the control valve device as produced pneumatically, the electric control according to my improvement will be considered.

The system being charged up from the train pipe as hereinbefore described, if it is desired to make an electric service application of the brakes, the electric brake switch is turned to electric application position, so as to supply current to the train wire 58 and thereby energize the magnet 40. The valve 41 is then opened by the operation of the magnet 40 and fluid under pressure is vented from chamber 43 adjacent the piston head 33 through pipes 42 and 44 to the emergency brake cylinder 30, or if desired, to the atmosphere directly. The outer faces of both piston heads 33 and 35 being now subject to atmospheric pressure, the fluid pressure acting on the inner differential area of the piston head 33 shifts the emergency valve mechanism 5 to the position shown in Fig. 2, in which the passage 75 is uncovered by the movement of the slide valve 47 and fluid is thereupon supplied from the emergency reservoir 39 to the emergency brake cylinder 30. Air continues to flow to the emergency brake cylinder so long as the valve 41 remains open. When the electric brake switch is turned to lap position, the magnet 40 is deënergized and the valve 41 is thereby closed. Fluid pressure then equalizes from the valve chamber 46 around the large piston head 33 and the emergency valve mechanism 5 is thereby shifted to its upper position, closing the supply passage 75.

The release magnet 45 and the valve 48 are preferably of the normally open type, that is to say, when the magnet 45 is deënergized, the valve 48 is open, permitting exhaust from pipe 50 to the exhaust port 51. Consequently, in making an electric application of the brakes, current is also supplied to the train wire 59, so that the magnet 45 is energized and the valve 48 is thereby closed. In the application lap position of the brake switch, the same connection is maintained, and the magnet 45 remains energized, thus holding the valve 48 closed and preventing the escape of fluid from the brake cylinder. The brakes may be applied with increased power by again turning the brake switch to application position, repeating the operation above described.

In order to release the brakes, the brake switch is turned to release position, in which current is cut off from the train wire 59 and the release magnet 45 is thereby deënergized. The release valve 48 then opens and fluid is released from the emergency brake cylinder, through pipe 32, passage 75, cavity 76 in slide valve 47, passage 49, and pipe 50. The release of the brakes may be graduated by alternately deënergizing and energizing the magnet 45, as will be apparent.

If it is desired to effect an emergency application of the brakes electrically, the brake switch is turned to emergency position, in which current is supplied to the train wire 61 and the emergency magnet 52 is thereby energized. The valve 53 is thereupon opened and fluid under pressure is supplied to the under side of the valve piston 29 from the emergency reservoir 39 through pipes 38 and 54, pipe 55 and passages 56 and 74. The valve piston 29 is thus lifted from its seat and fluid is admitted to the top of the emergency piston 25, so as to shift the same and open the valve 26 to vent air from the train pipe and thus effect a local reduction in train pipe pressure. This action occurs on each vehicle throughout the train and thereby the piston 17 of each control valve device is simultaneously shifted to emergency position and an emergency application of the brakes is produced in the same manner as hereinbefore described in connection with the pneumatic operation.

From the foregoing description, it will now be apparent that the brakes may be electrically controlled without impairing or interfering with the pneumatic control, so that if the electric control should fail, complete pneumatic control will be available at all times.

Having now described my invention, what I claim as new and desire to secure by Letters Patent, is:—

1. In a fluid pressure brake, the combination with a train pipe and an emergency valve mechanism operating upon a sudden reduction in train pipe pressure to effect an emergency application of the brakes, of electrically controlled means for also varying the pressure on said emergency valve mechanism independently of the train pipe pressure to effect a gradual application of the brakes.

2. In a fluid pressure brake, the combination with a train pipe and valve means operating upon a gradual reduction in train pipe pressure for effecting a service application of the brakes, of an emergency valve mechanism adapted upon a sudden reduction in train pipe pressure to effect an emergency application of the brakes and electrically controlled means for varying the pressure on said emergency valve mechanism independently of the train pipe pressure to effect a service application of the brakes.

3. In a fluid pressure brake, the combination with a train pipe, brake cylinder, and a valve device adapted upon a gradual reduction in train pipe pressure to supply fluid to said brake cylinder, of an emergency brake cylinder, an emergency valve mechanism adapted upon a sudden reduction in train pipe pressure to supply fluid to the emergency brake cylinder, and electrically controlled means for also operating said emergency valve mechanism to supply fluid to the emergency brake cylinder to effect a service application of the brakes.

4. In a fluid pressure brake, the combination with a train pipe, a source of fluid pressure, a service brake cylinder, and a valve device operating upon a gradual reduction in train pipe pressure for supplying fluid from said source of fluid pressure to the service brake cylinder, of an additional source of fluid pressure, an emergency brake cylinder, an emergency valve mechanism adapted upon a sudden reduction in train pipe pressure for supplying fluid from said additional source of fluid pressure to the emergency brake cylinder, and electrically controlled means for also operating said emergency valve mechanism to supply fluid from said additional source of fluid pressure to the emergency brake cylinder.

5. In a fluid pressure brake, the combination with a train pipe, a service brake cylinder, an emergency brake cylinder, and valve means adapted upon a gradual reduction in train pipe pressure to supply fluid to the service brake cylinder and upon a sudden reduction in train pipe pressure to supply fluid to the emergency brake cylinder, of a magnet valve device for also controlling said valve means independently of the train pipe pressure to effect the supply of fluid to said emergency brake cylinder.

6. In a fluid pressure brake, the combination with a train pipe, a service brake cylinder, an emergency brake cylinder, and valve means adapted upon a gradual reduction in train pipe pressure to supply fluid to the service brake cylinder and upon a sudden reduction in train pipe pressure to supply fluid to the emergency brake cylinder, of electrically controlled means for supplying and releasing fluid to and from the emergency brake cylinder.

7. In a fluid pressure brake, the combination with a train pipe, a brake cylinder, a reservoir, a valve device comprising a valve for controlling the supply of fluid to the brake cylinder and a piston normally subject on one side to fluid pressure supplied from the reservoir for operating said valve, and means adapted upon a reduction in train pipe pressure to vent fluid from said side of the piston to thereby operate said valve, of a magnet valve device adapted upon operation to vent fluid from said piston for also supplying fluid to the brake cylinder.

8. In a fluid pressure brake, the combination with a train pipe, a quick action valve mechanism for locally venting fluid from the train pipe on each vehicle of the train, and a valve piston for supplying fluid to said valve mechanism to operate the same, of electrically controlled means for operating said valve piston.

9. In a fluid pressure brake, the combination with a train pipe, a quick action valve mechanism comprising a valve for venting fluid from the train pipe to effect a local reduction in train pipe pressure, a piston for actuating said valve, and means operated upon a sudden reduction in train pipe pressure for supplying fluid to said piston for operating the same, of a magnet valve device operating independently of the train pipe pressure for also effecting the operation of said quick action valve mechanism.

10. In a fluid pressure brake, the combination with a train pipe and two brake cylinders, of means governed by variations in train pipe pressure for controlling the pressure in both brake cylinders and electrically controlled means for also controlling the pressure in one of said brake cylinders.

In testimony whereof I have hereunto set my hand.

WALTER V. TURNER.

Witnesses:
A. M. CLEMENTS,
S. W. KEEFER.